United States Patent
Chen et al.

(10) Patent No.: US 7,596,603 B2
(45) Date of Patent: Sep. 29, 2009

(54) AUTOMATIC EMAIL CONSOLIDATION FOR MULTIPLE PARTICIPANTS

(75) Inventors: Yen-Fu Chen, Austin, TX (US); John Hans Handy-Bosma, Cedar Park, TX (US); Mei Yang Selvage, Austin, TX (US); Nancy Sun, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 10/880,729

(22) Filed: Jun. 30, 2004

(65) Prior Publication Data

US 2006/0031324 A1 Feb. 9, 2006

(51) Int. Cl.
*G06F 15/16* (2006.01)

(52) U.S. Cl. .................. 709/206; 709/204; 715/200; 715/700

(58) Field of Classification Search .................. 709/206, 709/207
See application file for complete search history.

(56) References Cited

U.S. PATENT DOCUMENTS

| | | | |
|---|---|---|---|
| 5,878,230 A | 3/1999 | Weber et al. | |
| 6,122,632 A * | 9/2000 | Botts et al. | 707/10 |
| 6,275,848 B1 | 8/2001 | Arnold | |
| 6,415,290 B1 | 7/2002 | Botts et al. | 707/10 |
| 6,449,635 B1 | 9/2002 | Tilden, Jr. et al. | |
| 6,453,337 B2 | 9/2002 | Miller et al. | 709/204 |
| 6,457,045 B1 | 9/2002 | Hanson et al. | 709/206 |
| 6,496,849 B1 | 12/2002 | Hanson et al. | 709/200 |
| 6,505,233 B1 | 1/2003 | Hanson et al. | 709/204 |
| 6,549,957 B1 | 4/2003 | Hanson et al. | 710/5 |
| 6,563,912 B1 | 5/2003 | Dorfman et al. | 379/88.13 |
| 6,578,025 B1 | 6/2003 | Pollack et al. | 707/2 |
| 6,643,684 B1 | 11/2003 | Malkin et al. | |
| 6,745,197 B2 * | 6/2004 | McDonald | 707/102 |
| 6,823,368 B1 | 11/2004 | Ullmann et al. | |
| 2002/0097850 A1 | 7/2002 | Schemers et al. | |
| 2002/0099777 A1 | 7/2002 | Gupta et al. | |
| 2004/0064515 A1 * | 4/2004 | Hockey | 709/206 |
| 2004/0073616 A1 | 4/2004 | Fellenstein et al. | |
| 2004/0141004 A1 | 7/2004 | Cabezas et al. | |
| 2004/0221295 A1 * | 11/2004 | Kawai et al. | 719/313 |
| 2005/0060372 A1 * | 3/2005 | DeBettencourt et al. | 709/206 |
| 2005/0278426 A1 * | 12/2005 | Blagg | 709/204 |

* cited by examiner

*Primary Examiner*—Ario Etienne
*Assistant Examiner*—O. C Vostal
(74) *Attorney, Agent, or Firm*—Yee & Associates, P.C.; William H. Steinberg; Rudolf O. Siegesmund (57) ABSTRACT

The invention is a data processing means wherein human perceptible elements of electronic information are gathered, prepared, formatted, or otherwise processed in forming a unified collection of such information storable as a distinct entity. In particular, the invention is a process for composing and displaying a consolidated message document. The preferred embodiment of the invention is a computer program that configures a general-purpose computer to implement the inventive process. Responsive to a user's selection of a message, the inventive process identifies all related messages that the user has received, inserts the related messages into a consolidated message document, and displays the consolidated message document on the user's output device. The inventive process further comprises the steps of removing duplicate message content, sorting the related messages within the consolidated message document according to user-specified preferences, storing the consolidated message document, and marking the related messages for deletion.

2 Claims, 6 Drawing Sheets

| FROM | SUBJECT | RECEIVED | SIZE |
|---|---|---|---|
| MARY JONES | RE: XYZ UPDATE | 08/04/2003 03:45PM | 16KB |
| ✓ LARRY MCDONALD | RE: XYZ UPDATE | 08/03/2003 01:05PM | 20KB |
| ✓ JOHN DOE | RE: XYZ UPDATE | 08/03/2003 09:30AM | 45KB |
| ✓ JANE JOHNSON | RE: XYZ UPDATE | 08/02/2003 05:45PM | 12KB |
| KAY GONZALES | FRIDAY LUNCH | 08/02/2003 05:05PM | 2KB |
| BRAD MCCLAIN | TUESDAY MEETING INFORMATION | 08/01/2003 11:00AM | 6KB |
| TONY WOOD | DIRECTIONS | 08/01/2003 09:56AM | 5KB |
| DONNA NORTON | BUDGET ANALYSIS | 08/01/2003 09:25AM | 35KB |

AUTOMATIC EMAIL CONSOLIDATION FOR MULTIPLE PARTICIPANTS

CROSS-REFERENCE TO RELATED APPLICATION

The present invention is related to the subject matter of U.S. patent application Ser. No. 10/897,230, incorporated herein by reference.

FIELD OF THE INVENTION

The present invention generally relates to a data processing means or steps wherein human perceptible elements of electronic information are gathered, prepared, formatted, or otherwise processed in forming a unified collection of such information storable as a distinct entity. In particular, the present invention relates to means or steps for composing an email message document wherein one or more elements of the document are extracted from related email message documents.

BACKGROUND OF THE INVENTION

Currently, email clients such as MICROSOFT OUTLOOK and LOTUS NOTES enable a user to exchange electronic messages with other users through networked email servers. These email clients typically display to a user a list of messages that the user has received. If the user wants to view the full message, the user selects the message from the displayed list and the email client renders the selected message on the display device. The user must repeat this process for every separate message that the user wants to view.

Many common email clients also enable a user to sort and group messages by various message attributes, including the subject line. Thus, users can group related messages and replies in the displayed list, but still must view each message individually.

Figure 1:
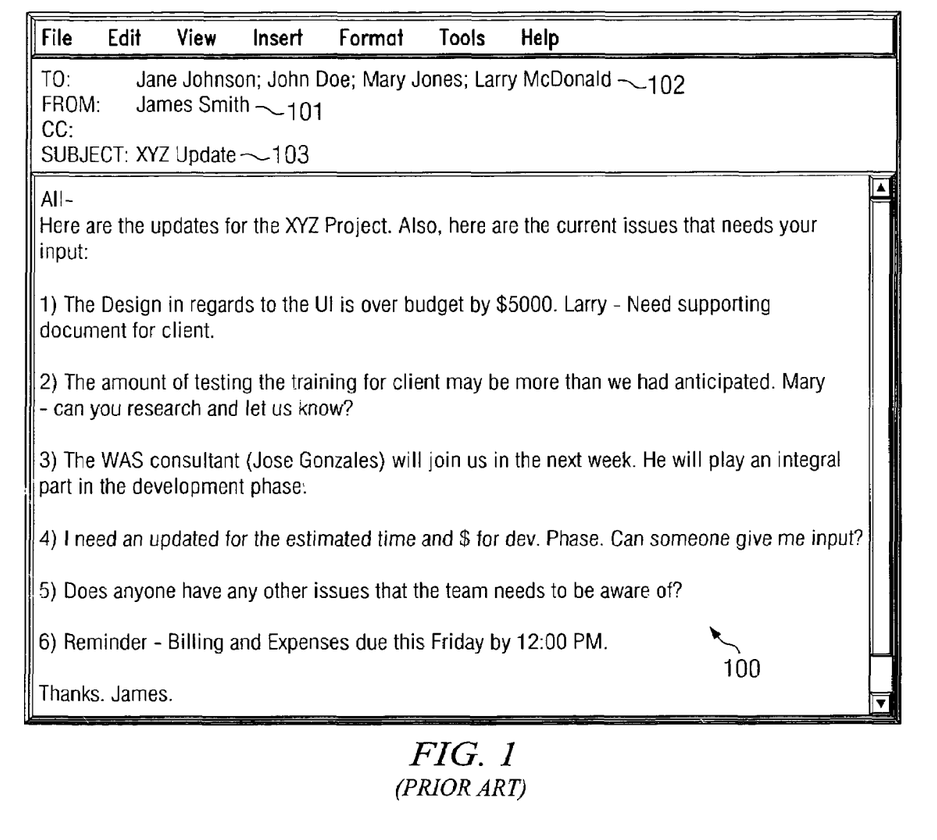
FIG. 1 represents a message that a user has created to send to multiple recipients.
Figure 2:
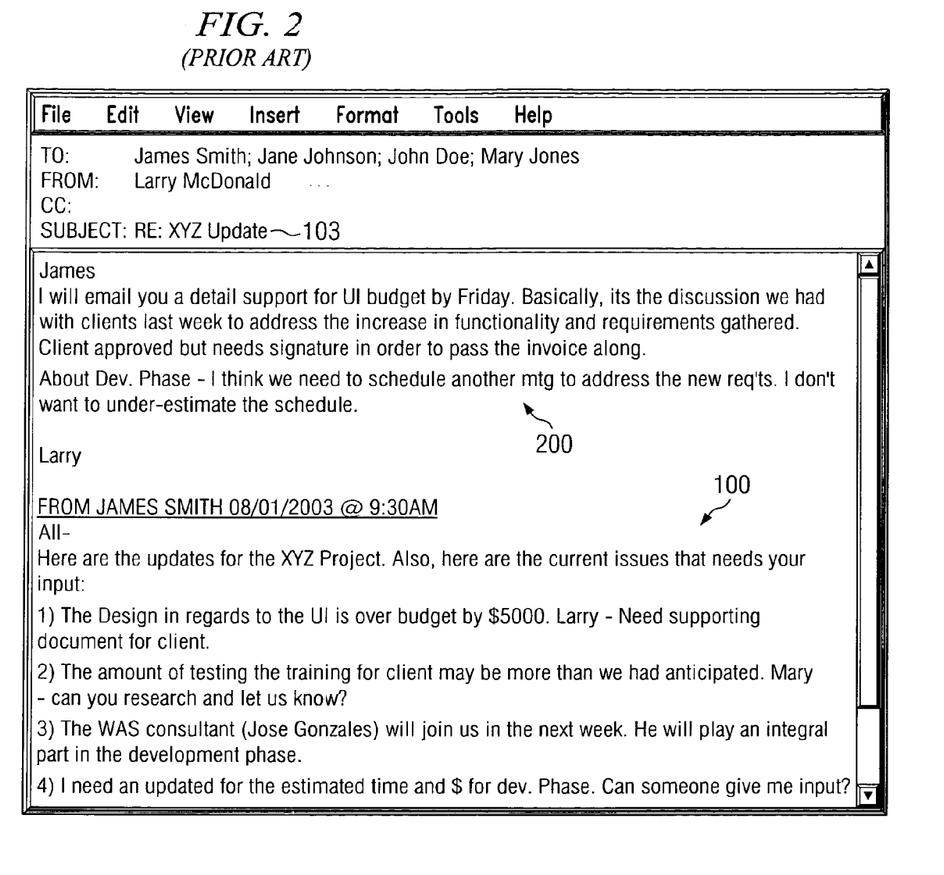
FIG. 2 and FIG. 3 represent typical responses to the message of FIG. 1, using prior art system.
Figure 3:
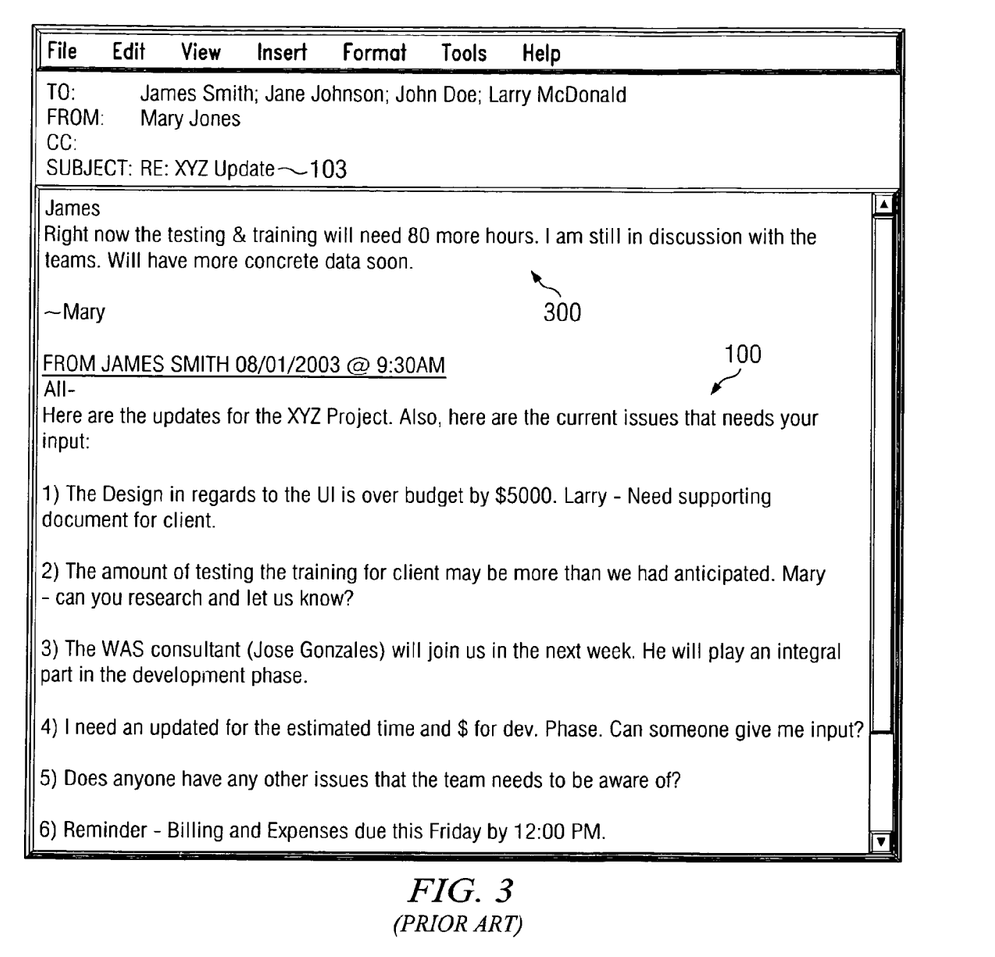

If a user wants to respond to a message, the user simply selects the message from the displayed list, much like viewing the message, and activates a "reply" command. In general, an email client responds to a "reply" command by creating a new message with the same subject line. Many email clients also copy the content of the original message into the reply message. FIG. 1, for example, depicts message text 100 that user 101 has created to send to four recipients 102, with subject line 103. FIGS. 2 and 3 represent typical responses to the message illustrated in FIG. 1. As illustrated in FIGS. 2 and 3, each response contains the same subject line 103. Additionally, each response contains the original message text 100 as well as the response text 200 and 300.

The typical email client's response to a reply command, which generally includes copying the original message content into the reply message, may be useful and convenient for users exchanging a limited number of messages. As the number of electronic messages and replies increases, though, the duplicate content increases the burden on the user to process and manage the information in the messages, and may increase the burden on the underlying data storage system as well. The burden increases proportionally with each additional user that participates in the exchange.

While common email clients relieve some of the burden by allowing the user to group related messages in the displayed list of messages, such functionality does not relieve the user of the burden of opening and reading multiple messages, nor does it relieve the burden on the underlying data storage system.

U.S. Pat. No. 6,453,337 (issued Sep. 17, 2002) (the '337 patent) discloses methods and systems for creating, tracking, and managing the states of electronic media containing static and dynamic content (which the '337 patent refers to as a "zaplet"). The dynamic content is stored in a database accessible over a network through a server. The server accepts input from one or more "participants" in the zaplet to update the dynamic content. Thus, the '337 patent addresses some of the problems associated with group communication through an electronic medium, but the systems and methods disclosed therein rely on a complex authoring and delivery system and require a dedicated server to process the communications and update content. U.S. Pat. No. 6,457,045 (issued Sep. 24, 2002), U.S. Pat. No. 6,496,849 (issued Dec. 17, 2002), and U.S. Pat. No. 6,505,233 (issued Jan. 7, 2003) all generally relate to the same methods and systems disclosed in the '337 patent, and all require a similar complex computing infrastructure to achieve the desired results.

Thus, email client users need an improved means for using existing messaging systems to process, display, and store multiple related electronic messages. The present invention addresses this need.

SUMMARY OF THE INVENTION

It is an object of the present invention to provide email users with a method to store messages without duplicating message content.

An additional object of the present invention is to provide participants of an extended message exchange with a method for viewing a more complete conversation without needing to open or otherwise sort all responses individually.

An additional object of the present invention is to increase the efficacy of electronic communications, including reducing the time spent to sort and read through multiple responses in different messages from multiple senders.

An additional object of the present invention is to increase the storage efficiency for electronic communications.

These and other objects of the invention will be apparent to those skilled in the art from the following detailed description of a preferred embodiment of the invention.

The invention disclosed herein is a process for composing and displaying a consolidated message document. The preferred embodiment of the disclosed invention is a computer program that configures one or more general-purpose computers to implement the inventive process.

Responsive to a user's selection of a message, the inventive process identifies all other related messages that the user has received, inserts the related messages into a consolidated message document, and displays the consolidated message document on the user's output device. In the preferred embodiment, the inventive process further comprises the steps of removing duplicate message content, sorting the related messages within the consolidated message document according to user-specified preferences, storing the consolidated message document, and marking the related messages for deletion.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention.

As used herein, the term "computer" includes, without limitation, any machine that is capable of processing data and performing logic operations according to a predefined set of instructions.

A "program" includes any predefined set of instructions capable of directing a computer to process data or perform logic operations.

Figure 4:
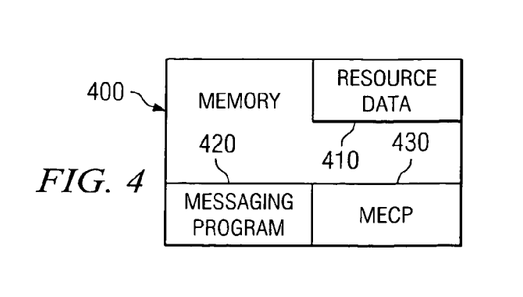
FIG. 4 illustrates the internal configuration of a computer having the computer program of the present invention loaded into memory.

The internal configuration of a computer, including connection and orientation of the processor, memory, and input/output devices, is well known in the art. FIG. 4 represents the internal configuration of a computer having the computer program of the present invention loaded into memory 400. The computer program of the present invention is depicted as message extraction and consolidation program (MECP) 430, which operates in concert with messaging program 420. Memory 400 is only illustrative of memory within a computer and is not meant as a limitation. Memory 400 also contains resource data 410. The present invention may interface with resource data 410 through memory 400.

In alternative embodiments, MECP 430 and its components can be stored in the memory of other computers. Storing MECP 430 in the memory of other computers allows the processor workload to be distributed across a plurality of processors instead of a single processor. Further configurations of MECP 430 across various multiple memories and processors are known by persons skilled in the art.

Figure 5:
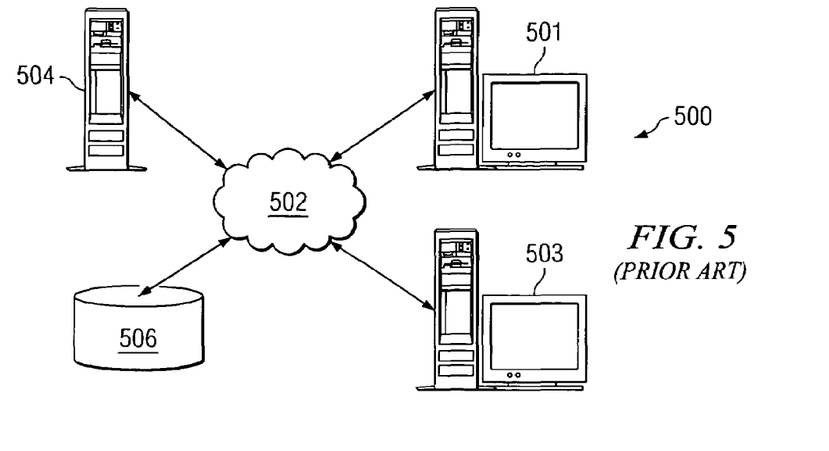
FIG. 5 illustrates a prior art architecture for connecting various hardware devices to create a network for transferring data.

FIG. 5 illustrates a common prior art architecture for connecting various hardware devices to create a network for transferring data. Computer network 500 comprises local computer 501 electrically coupled to network connection 502. In FIG. 5, local computer 501 is coupled electrically to remote computer 503 via network connection 502. Local computer 501 also is coupled electrically to server 504 and persistent storage 506 via network connection 502. Network connection 502 may be a simple local area network (LAN) or may be a larger wide area network (WAN), such as the Internet. While computer network 500 depicted in FIG. 5 is intended to represent a possible network architecture, it is not intended to represent an architectural limitation.

MECP 430 described herein can be stored within memory 400 of any computer or server depicted in FIG. 5. Alternatively, MECP 430 can be stored in an external storage device such as persistent storage 506, or a removable disk such as a CD-ROM (not pictured). Additionally, messaging program 420 and MECP 430, as described in detail below, are generally loaded into the memory of more than one computer of FIG. 5 to enable users on different computers to exchange messages over network connection 502.

Messaging program 420 represents any computer program that configures a computer to send and receive messages through a communications media, such as network connection 502. A person of skill in the art will appreciate that messaging program 420 may be embodied in any prior art electronic mail program loaded into the memory of a local computer, such as local computer 501. A person of skill in the art also will appreciate that the inventive functions of MECP 430 may be implemented as a stand-alone program, or be integrated into any prior art messaging program, such as messaging program 420.

Figure 6:
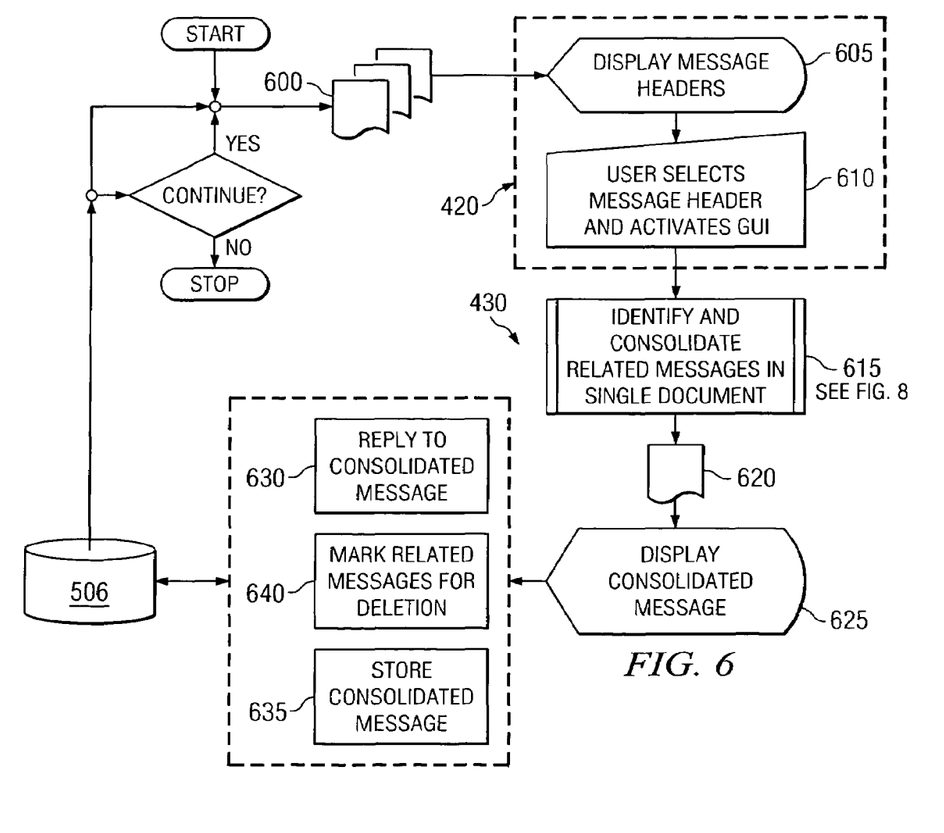
FIG. 6 illustrates the function of the present invention integrated with a prior art messaging system.

FIG. 6 illustrates the general operation of the present invention when integrated with messaging program 420. In general, messaging program 420 receives and stores messages 600 in persistent storage, such as persistent storage 506, in real time. The data structure of a message 600 is well known in the art and is not described in detail here. For purposes of this discussion, though, each message 600 is assumed to comprise a message header and a message body. A message header includes data that represents properties of the respective message, such as the sender, subject, and date. A message body includes data that represents the substance of the communication.

Figure 7:
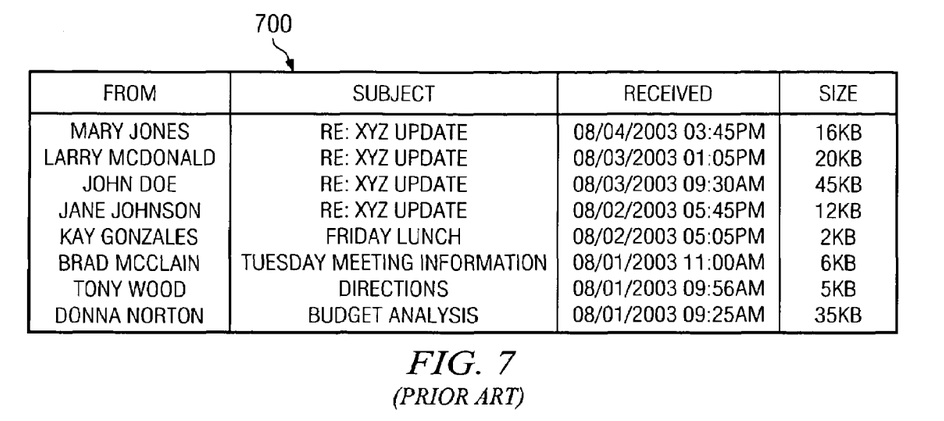
FIG. 7 represents a typical prior art listing of message headers in a graphical user interface.

Referring again to FIG. 6, messaging program 520 displays a message header (605) for each message in persistent storage, and updates the display as it receives and stores new messages. FIG. 7 represents a typical prior art graphical user interface (GUI) to the list of message headers. GUI 700 is referred to colloquially as an "Inbox." To view a message body, a user generally selects a message header and then "double-clicks" the header or selects an "open" command from a menu (610). In the preferred embodiment, GUI 700 includes a single command button with which a user can activate MECP 430. MECP 430 then identifies and consolidates any messages related to the user-selected message (615), resulting in consolidated message document 620. The process of identifying and consolidating related messages is described in detail below and illustrated in FIG. 8. Messaging program 420 then displays consolidated message document 620 (625). As indicated in FIG. 6, various embodiments of MECP 430 provide a user with options to reply to multiple messages by replying to consolidated message document 620 (630), as well as options for storing consolidated message document 620 (635) and marking related messages for deletion (640). MECP 430 also may allow a user to forward consolidated message document 620 to additional recipients.

The following discussion assumes, for illustrative purposes only, that a user ("the sender") has sent an initial message substantially similar to the message depicted in FIG. 1. This discussion also assumes that the sender has received responsive messages substantially similar to those depicted in FIG. 2 and FIG. 3. The sender also may have received additional responses and messages, as represented in GUI 700 (see FIG. 7). Finally, as discussed above, MECP 430 generally executes in response to a user's command to view a message. A person of skill in the art will appreciate that there are many methods for implementing a GUI to MECP 430, and such methods are not described in detail here.

Figure 8:
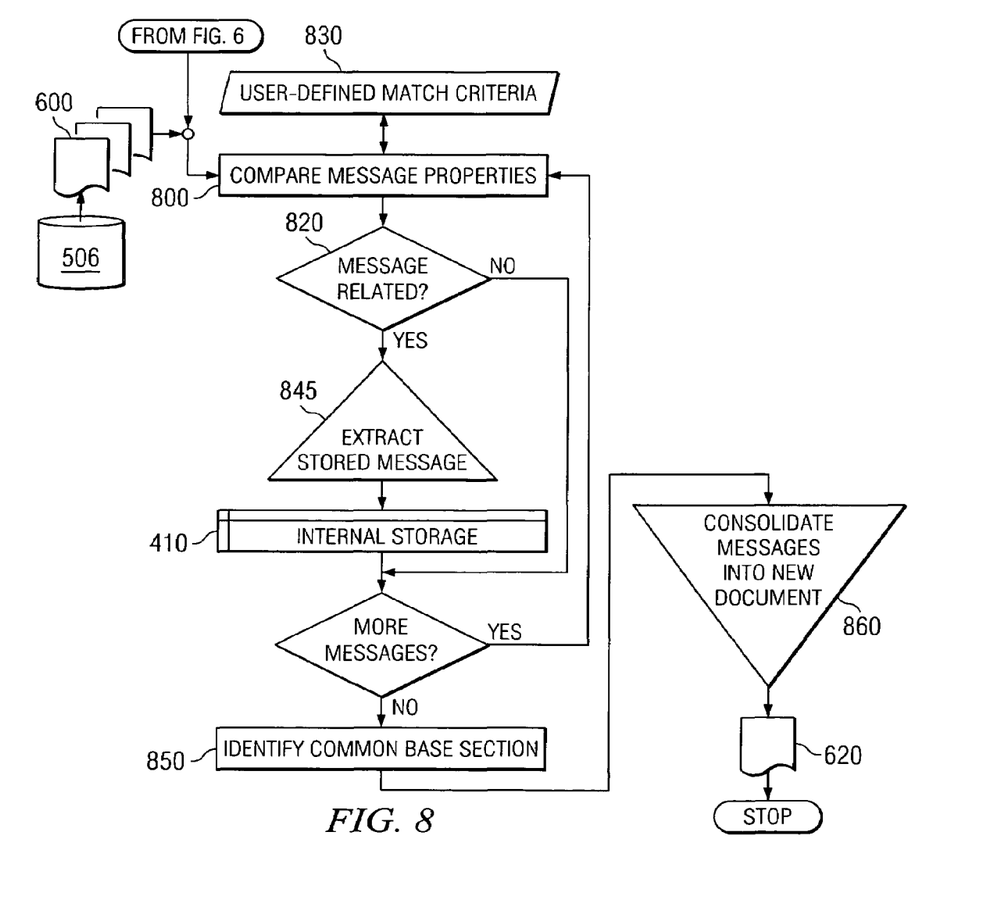
FIG. 8 illustrates the inventive process for composing and displaying a consolidated message document.

Referring to FIG. 8 for illustration, MECP 430 responds to a user's command to view a message by comparing stored messages 600 in persistent storage 506 (800) with the message that the user has selected for viewing (the "active" message). MECP 430 examines the properties of each stored message 600 to determine if the message's properties match the active message's properties (820), according to pre-defined match criteria 830. The preferred embodiment of MECP 430 allows the user to define the criteria for matching messages, as indicated in FIG. 8, but a person of skill in the art will appreciate that a system administrator or other party also may establish the criteria, or embed them directly into the program itself. Any message 600 that matches the active message, as determined by the pre-defined criteria, is referred to herein as a "related" message. If MECP 430 determines that a message 600 is related to the active message, MECP 430 extracts the message to resource data 410 (845). Once MECP 430 has identified all related messages, MECP 430 then identifies sections of related messages that are duplicated in each message (850). A process for identifying duplicate message content is disclosed in U.S. patent application Ser. No. 10/897,230, which is incorporated herein by reference, but other processes available in the art may be used as well. Sections of duplicate message content are referred to herein collectively as the "base section;" sections that are not comprised of duplicate content are referred to as "new" sections. After identifying the base section and any new sections, MECP 430 creates consolidated message document 620 and inserts the base section. MECP 430 then merges all new sections of related messages 600 in consolidated document 620 (860). In a preferred embodiment, MECP 430 also arranges new sections of related messages 600 within consolidated message document 620 according to the user's preferences. MECP 430 may be configured to use any number of message properties, including timestamp, subject, sender, or any combination thereof, to arrange related messages 600 within consolidated message document 620. A person of skill in the art will appreciate that MECP 430 may be configured to arrange related messages 600 according to predefined, default criteria, or according to a user's preferences.

Figure 9:
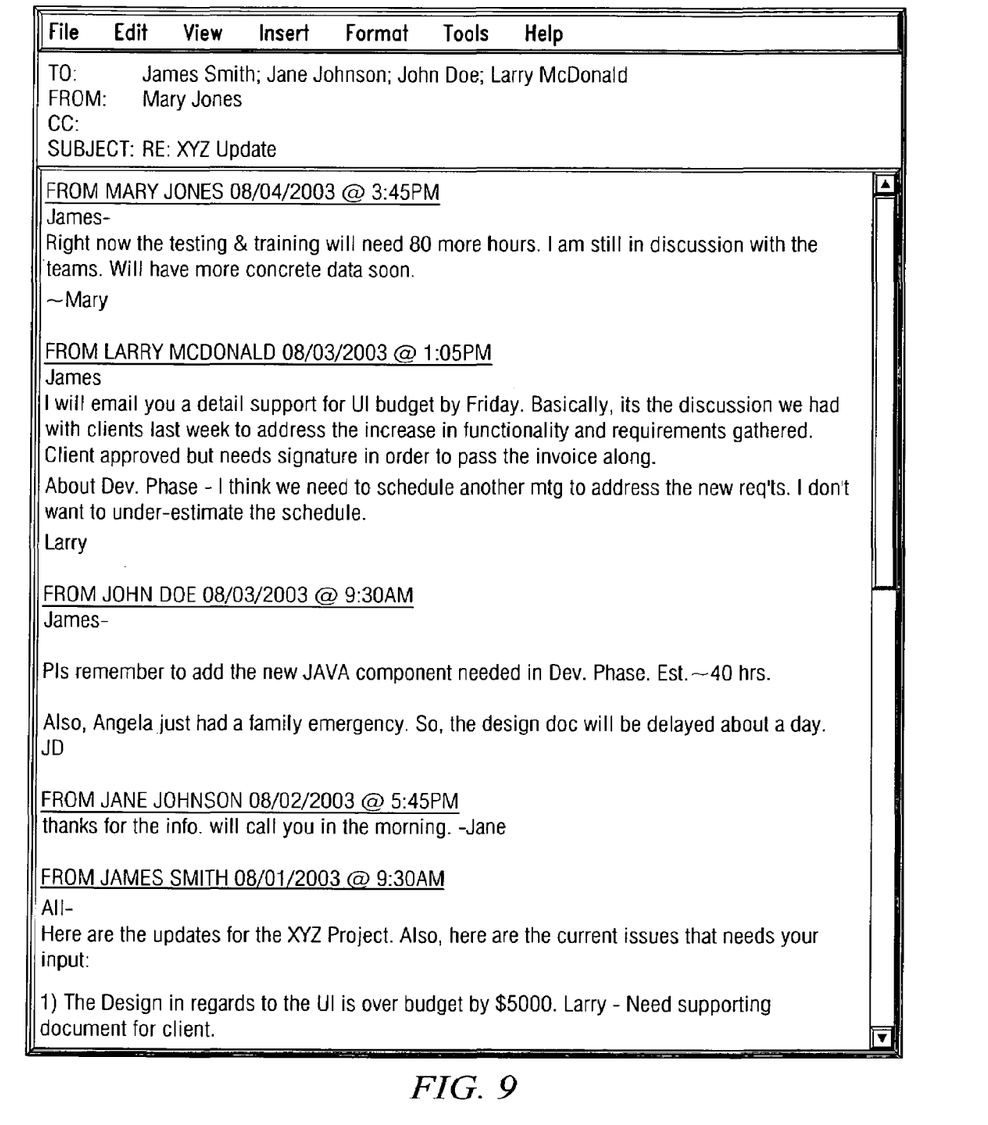
FIG. 9 represents an embodiment of a consolidated message document.

Thus, referring to FIG. 7 for illustrative purposes, if a user selects the message header with the subject line "RE: XYZ Update" received at 3:45 P.M. on August 4 from Mary Jones, then MECP 430 will examine all other messages for similar properties. Although MECP 430 may use any number of criteria to establish that a message is related to another, for purposes of this example, it is assumed that MECP 430 has been configured to examine the "subject" field. Thus, in this example, MECP 430 would determine that only the three most recent messages are related to the active message, since those three messages are the only messages with identical subject lines. Consequently, MECP 430 would store only these three messages as resource data 410. MECP 430 would then identify the base section, which, in this example, would comprise the initial message (see FIG. 1), and insert the base section into a consolidated message document. MECP 430 would then insert any new sections, including any new sections in the active message, into the same consolidated message document. In alternate embodiments, MECP 430 may include only new sections of related messages that the user received before the active message, or may include all new sections. In a preferred embodiment, if MECP 430 includes only new sections from previous messages, then MECP 430 would notify the user that the user has received other related messages after receiving the active message, but the later messages are not included in the consolidated message document. FIG. 9 represents one embodiment of the consolidated message document that MECP 430 would produce if given the messages discussed in this example.

In its preferred embodiment, MECP 430 further includes security controls that allow a user to limit a recipient's ability to alter the contents of the consolidated message document.

Figure 10:
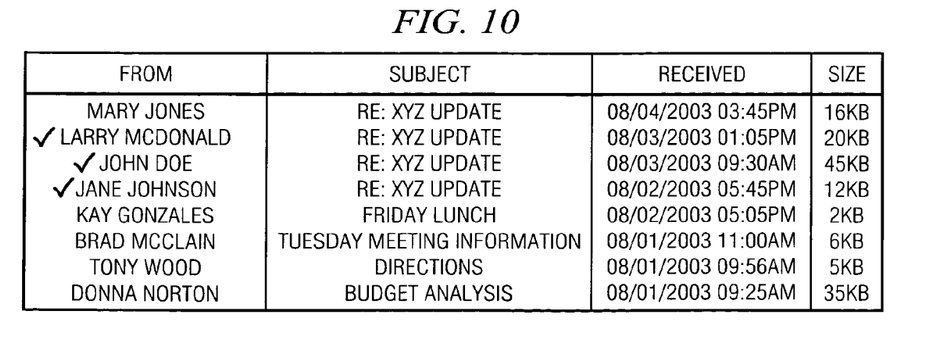
FIG. 10 illustrates an embodiment of a graphical user interface to a messaging system integrated with the present invention.

In its preferred embodiment, MECP 430 also marks related messages for deletion, in order to facilitate managing and storing messages. Referring again to the example just discussed, after MECP 430 generates the consolidated message document of FIG. 9, MECP 430 would mark each of the related messages for deletion, as depicted in FIG. 10. The user, then, could delete the related messages with a single click of a command button. Alternatively, the user could configure MECP 430 to delete such related messages automatically.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. a computer-implemented process for reducing an amount of storage used by a messaging program and an amount of user time involved reading and responding to a plurality of email messages having duplicate content, the computer implemented process comprising the steps of:

a. integrating a message extraction and consolidation program with the messaging program, the messaging program receiving the plurality of email messages and storing the plurality of email messages in a storage;

b. responsive to an activation of a single command button on a graphical user interface, activating the message extraction and consolidation program;

c. responsive to the activation of the message extraction and consolidation program, displaying a plurality of message headers, each message header representing a corresponding email message in the storage;

d. responsive to a user's selection of a message header, automatically performing steps comprising:

e. identifying the user's selection as an active message;

f. comparing a user selected property of the active message to a plurality of properties of each of the plurality of email messages in the storage;

g. responsive to determining all matches between the user selected property and the plurality of properties of each of the plurality of email messages in the storage, identifying each of the plurality of email messages having a property matching the active message property as a related email message;

h. responsive to identifying a plurality of related email messages in the storage, extracting each related email-message to a resource data file;

i. identifying each section of each related email message that is duplicative as a base section;

j. identifying each section of each related email message that is not duplicative as a new section;

k. creating a consolidated email message;

l. inserting the base section into the consolidated email message;

m. merging each new section into the base section;

n. arranging each new section within the consolidated email message in accordance with a user preference;

o. displaying the consolidated email message on the graphical user interface; and p. storing the consolidated email message in the storage and deleting each related email message from the storage;

q. wherein the amount of storage time used by the messaging program and the amount of user time involved reading and responding to the plurality of email messages having duplicate content is reduced.

2. a computer-implemented process comprising:

a. integrating a message extraction and consolidation program with the messaging program, the messaging program receiving a plurality of email messages and storing the plurality of email messages in a storage;

b. responsive to an activation of a single command button on a graphical user interface, activating the message extraction and consolidation program; and c. responsive to the activation of the message extraction and consolidation program, displaying a plurality of message headers, each message header representing a corresponding email message in the storage;

d. responsive to a user's selection of a message header, automatically performing steps comprising:

d1. identifying the user's selection as an active message;

d2. comparing a user selected property of the active message to a plurality of properties of each of the plurality of email messages in the storage;

d3. responsive to determining all matches between the user selected property and the plurality of properties of each of the plurality of email messages in the storage, identifying each of the plurality of email messages having a property matching the active message property as a related email message;

d4. responsive to identifying a plurality of related email messages in the storage, extracting each related email-message to a resource data file;

d5. identifying each section of each related email message that is duplicative as a base section; and d6. identifying each section of each related email message that is not duplicative as a new section;

e. creating a consolidated email message by inserting the base section into a blank email message and merging each new section into the base section;

f. arranging each new section within the consolidated email message in accordance with a user preference;

g. displaying the consolidated email message on the graphical user interface; and h. storing the consolidated email message in the storage and deleting each related email message from the storage;

i. wherein the amount of storage time used by the messaging program and the amount of user time involved reading and responding to the plurality of email messages having duplicate content is reduced.

\* \* \* \* \*

UNITED STATES PATENT AND TRADEMARK OFFICE
CERTIFICATE OF CORRECTION

PATENT NO. : 7,596,603 B2 Page 1 of 1
APPLICATION NO. : 10/880729
DATED : September 29, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1287 days.

Signed and Sealed this

Twenty-eighth Day of September, 2010

David J. Kappos
*Director of the United States Patent and Trademark Office*